United States Patent
Slater et al.

[11] Patent Number: 6,034,763
[45] Date of Patent: *Mar. 7, 2000

[54] DUAL BEAM LASER DEVICE FOR LINEAR AND PLANAR ALIGNMENT

[75] Inventors: Dan Slater, La Habra Heights; David M. Kramer, Palos Verdes, both of Calif.

[73] Assignee: Nearfield Systems Incorporated, Carson, Calif.

[*] Notice: This patent is subject to a terminal disclaimer.

[21] Appl. No.: 09/170,626

[22] Filed: Oct. 13, 1998

Related U.S. Application Data

[63] Continuation of application No. 08/675,655, Jul. 3, 1996, Pat. No. 5,838,430.

[51] Int. Cl.$^7$ .................................................. G01B 11/26
[52] U.S. Cl. .................................................................. 356/138
[58] Field of Search ........................... 356/138, 73, 150, 356/400, 248, 250, 153, 148, 149, 399, 247, 401, 351, 152.1–152.3, 140, 141.1–141.5; 250/234

[56] References Cited

U.S. PATENT DOCUMENTS

| | | |
|---|---|---|
| 3,816,000 | 6/1974 | Fiedler . |
| 4,035,084 | 7/1977 | Ramsay . |
| 4,062,634 | 12/1977 | Rando et al. . |
| 4,154,507 | 5/1979 | Barr . |
| 4,170,401 | 10/1979 | Yoder, Jr. et al. . |
| 4,297,031 | 10/1981 | Hamar . |
| 4,367,949 | 1/1983 | Lavering . |
| 4,382,680 | 5/1983 | Hamar . |
| 4,634,880 | 1/1987 | Lindau et al. . |
| 4,662,707 | 5/1987 | Teach et al. . |
| 4,676,598 | 6/1987 | Markley et al. . |
| 4,770,480 | 9/1988 | Teach . |
| 4,774,405 | 9/1988 | Malin . |
| 4,830,489 | 5/1989 | Cain et al. . |
| 4,844,618 | 7/1989 | Hamar . |
| 4,884,697 | 12/1989 | Takacs et al. . |
| 5,295,018 | 3/1994 | Konuma et al. . |
| 5,307,368 | 4/1994 | Hamar . |
| 5,408,318 | 4/1995 | Slater . |
| 5,517,023 | 5/1996 | Ohtomo et al. . |

OTHER PUBLICATIONS

Hindman; "Position . . . System" Antenna Measurement Techniques Association Conference Oct. 3–7, 1994 pp. 1–6.

"A 550 GHz Near–Field Antenna Measurement System For The NASA Submillimeter Wave Astronomy Satellite" by Dan Slater, Antenna Measurement Techniques Association Conference, Oct. 3–7, 1994.

"Position Correction On Large Near–Field Scanners Using An Optical Tracking System" by Greg Hindman, Antenna Measurement Techniques Association Conference, Oct. 3–7, 1994.

"Antenna Measurements Come In From The Cold" by Greg Hindman, T&MW Communications Test Supplement, Apr. 1992.

*Primary Examiner*—K P Hantis
*Attorney, Agent, or Firm*—O'Melveny & Myers LLP

[57] ABSTRACT

A high precision alignment apparatus is provided that utilizes a semiconductor laser device, such as a laser diode, to provide a source laser beam. The alignment apparatus permits the division of a pair of beam components from the source laser beam useful for either linear or planar alignment. A centroid measurement between the beam components provides a corrected reference point that accounts for the inherent instability of the source laser beam to yield a high level of alignment accuracy. For linear alignment purposes, the beam components are collinearly directed. In the alternative, for planar alignment purposes, the beam components may be either collinear or directed in opposite directions, and rotated to sweep respective planar regions. The laser alignment apparatus is capable of providing a level of accuracy heretofore achievable only with gas lasers, while maintaining the economical attributes of commercial semiconductor laser diodes.

36 Claims, 5 Drawing Sheets

DUAL BEAM LASER DEVICE FOR LINEAR AND PLANAR ALIGNMENT

RELATED APPLICATION

This application is a continuation of application Ser. No. 08/675,655, filed Jul. 3, 1996, now issued as U.S. Pat. No. 5,838,430 on Nov. 17, 1998.

BACKGROUND OF THE INVENTION

1. Field of the Invention

The present invention relates to laser systems useful for precision linear and planar alignment, and more particularly, to an apparatus that performs a light energy centroid measurement between a pair of reference laser beams in order to significantly improve alignment accuracy.

2. Description of Related Art

Laser emitters and detectors are commonly used in industry to perform precision alignment and measurement. In one type of such system, a laser device emits a laser beam that can provide a relatively accurate reference line. A detector operated in conjunction with the laser can measure displacement between the beam and an object requiring alignment to the laser axis.

Alternatively, a laser device may be oriented with a rotating pentaprism or penta-mirror assembly that deflects the laser beam through a precise 90° angle and sweeps the beam to provide a flat plane that is perpendicular to the input laser beam. The plane can be used as a reference to which the alignment and/or position of other objects can be compared. Such laser alignment systems have various applications within construction, surveying or manufacturing. In one possible application, a laser beam alignment device could be used in commercial construction to define a plumb line or a planar laser beam alignment device used to build a wall. Examples of such laser beam alignment devices are disclosed in U.S. Pat. No. 4,676,598 to Markley et al. for MULTIPLE REFERENCE LASER BEAM APPARATUS, and in U.S. Pat. No. 4,662,707 to Teach et al. for LIGHTHOUSE STRUCTURE AND COMPENSATING LENS IN REFERENCE LASER BEAM PROJECTING APPARATUS.

Traditionally, the laser beam in such alignment systems is generated by a laser tube containing a suitable active gaseous element, such as helium-neon gas. The gas is excited by an optical or electrical source to emit a low-powered collimated output beam in the red band of the light spectrum. These so-called gas lasers produce a thermally stable beam that is useful for producing highly accurate measurements over relatively long distances (e.g., hundredths of an inch over one hundred feet of distance). Despite the inherent stability of reference beams produced by gas lasers, however, these laser devices are also very energy inefficient, expensive, relatively large and fragile.

In view of the noted deficiencies of gas lasers, laser diodes have increased in commercial popularity as a suitable alternative. A laser diode is a semiconductor device, usually of the gallium-arsenide type, that emits coherent light when a voltage is applied to its terminals. Laser diodes are substantially less expensive than gas lasers, and can be manufactured in a smaller, rugged, more compact package. A significant drawback of laser diodes is that they produce a far less stable beam than gas lasers. In particular, the laser beam does not have uniform intensity over its cross-section and the energy of the beam decreases with distance from the center of the beam. Moreover, the rate of change of the intensity is not uniform, and the center of beam energy will periodically shift in accordance with temperature. As a result of these deficiencies, a linear or planar alignment device using a laser diode cannot be expected to achieve the same degree of accuracy as gas lasers.

Prior art devices have sought to overcome the inadequacy of laser diodes in order to approximate the stability of gas lasers. In particular, U.S. Pat. No. 5,307,368 to Hamar for LASER APPARATUS FOR SIMULTANEOUSLY GENERATING MUTUALLY PERPENDICULAR PLANES discloses a laser alignment device having a hollow spindle with an aperture that is rotatably mounted within bearings. Laser light from a laser diode floods the aperture so that only the centermost portion of the beam passes entirely through the spindle. The laser alignment device disclosed by Hamar purports to provide a centered beam of uniform density and circular cross-section. In practice, however, the resulting beam still cannot achieve the stability of gas laser beams due to thermal shifts over time within the center of beam energy that passes through the spindle.

Notwithstanding this significant drawback, laser diodes are still acceptable for most alignment applications. In general, commercial construction applications do not require a level of accuracy high enough to justify the additional expense of a gas laser, and, in these applications, a laser beam generated by a laser diode can provide a sufficient level of stability. As a result, demand for laser diodes has totally outstripped demand for gas lasers and, currently, there are few suppliers willing to produce gas lasers to satisfy the particular applications that require greater accuracy than that achievable with laser diodes.

Accordingly, a critical need exists for a laser alignment apparatus capable of providing a highly stable and accurate beam suitable for such critical linear and planar alignment applications. Such a laser alignment apparatus should be capable of providing a level of accuracy heretofore achievable only with gas lasers, while maintaining the economical attributes of commercial laser diodes.

SUMMARY OF THE INVENTION

A high precision alignment apparatus is provided that utilizes a collimated light source, such as a laser diode, to provide a source laser beam. The alignment apparatus permits the division of a pair of beam components from the source laser beam useful for either linear or planar alignment. A centroid measurement between the beam components provides a corrected linear or planar reference point that accounts for the inherent instability of the source laser beam and yields a high level of alignment accuracy.

In a first embodiment of the invention, a planar alignment apparatus is provided. The apparatus comprises a laser diode providing a source laser beam and a wedge having first and second faces that intersect at a 90° angle. The beam is directed at the intersection of the first and second faces of the wedge, which have surfaces that respectively reflect the first and second beam components in opposite directions. The wedge is rotated about a spin axis orthogonal to the reflected beam components and approximately coincident with the source laser beam to cause the first and second beam components to sweep respective planar regions. A stable planar measurement is obtained by detecting a common centroid of the first and second beam components, using a photodetector oriented to permit the first and second beam components to impinge thereon. As the source laser beam deviates due to thermal or angular effects, the first component will shift upward while the second component shifts downward, or vice versa. The centroid measurement of the first and second beam components thus represents a weighted average position of the two beam components that can be used to define a stable planar measurement point for the planar alignment apparatus.

In a second embodiment of the invention, a linear or axial alignment apparatus is provided. A source laser beam from a semiconductor device is divided into first and second beam components that may be partially overlapping. A first optical element disposed at a predetermined angle with respect to an optical axis reflects the first beam component therefrom in a direction normal to the axis and transmits the second beam component therethrough. The optical axis is approximately coincident with the source laser beam. A second optical element collinearly reflects the reflected first beam component back to the first optical element, the first beam component being thereby transmitted through the first optical element. A third optical element disposed normal to the axis coaxially reflects the second beam component back to the first optical element. The reflected second beam component thereby reflects off of the first optical element in a partially overlapping manner with the first beam component.

A linear or planar alignment measurement is made by detecting a common centroid of the first and second beam components. A photodetector is oriented to permit the first and second beam components to impinge thereon and provide the common centroid measurement therefrom. Thereby, the collinear and overlapping beams provide a reference for a linear alignment system. Alternatively, by rotating the overlapping beam components about the optical axis, the beam components sweep a planar region to provide a planar alignment system.

In a third embodiment of the invention, a planar alignment apparatus is provided. A semiconductor laser source provides a laser beam that is divided into a first and second beam component directed in opposite directions. A first optical element disposed at a predetermined angle with respect to an optical axis approximately coincident with the laser beam reflects the first beam component therefrom in a direction normal to the optical axis and transmits the second beam component therethrough. A second optical element collinearly reflects the transmitted second beam component back to the first optical element, with the first beam component being thereby reflected therefrom in a direction normal to the optical axis and opposite to the direction of the first beam component. The first and second beam components are rotated about the optical axis to sweep respective planar regions, and a common centroid measurement of the first and second beam components is made to provide a planar alignment system.

In a fourth embodiment of the invention, a planar alignment apparatus is provided. A semiconductor laser emitting source provides a laser beam and the laser emitting source is rotated about a spin axis approximately coincident with the laser beam at a first rotational rate. The laser beam is reflected in a direction normal to the spin axis by an optical element having a plurality of reflecting surfaces, which is rotated about the spin axis at a second rotational rate to cause the reflected laser beam to sweep through a substantially planar region. The first rotational rate is half that of the second rotational rate. A centroid measurement of the reflected laser beam provides planar alignment information.

In a fifth embodiment of the invention, a planar or linear alignment apparatus is provided. A semiconductor laser source provides a laser beam that is divided into collinear first and second beam polarization components. A first optical element disposed at a predetermined angle with respect to the laser beam reflects the laser beam therefrom. A second optical element reflects the first beam polarization component therefrom back to the first optical element, the first beam polarization component being thereby transmitted through the first optical element in a reference direction. The second optical element further transmits the second beam polarization component therethrough. A third optical element coaxially reflects the second beam polarization component back to the first optical element, the reflected second beam polarization component being thereby transmitted through the first optical element in a collinear manner with the first beam polarization component in the reference direction. A common centroid of the first and second beam polarization components provides linear alignment information. Alternatively, the first and second beam polarization components may be rotated about an axis orthogonal to the reference direction to sweep respective planar regions. A common centroid measurement of the first and second beam polarization components is made to provide planar alignment information.

In a sixth embodiment of the invention, a linear or planar alignment apparatus is provided. A collimated light source provides a laser beam that is divided by an optical element into collinear first and second beam components. The optical element comprises a plurality of surfaces and a partially reflective boundary. The laser beam impinges upon a first surface thereof and is internally deflected into the optical element. A first beam component is reflected from the partially reflective boundary and passes through a second surface of the optical element in a reference direction. A second beam component is thereby transmitted through the partially reflective boundary and passes through a third surface of the optical element in the reference direction. A common centroid of the first and second beam components provides linear or planar alignment information.

In a seventh embodiment of the invention, a planar alignment apparatus is provided. A collimated light source provides a first and a second laser beam that are directed in opposite directions. The collimated light source is rotated about an axis to cause the first and second laser beams to sweep respective planar regions. A common centroid of the first and second laser beams provides planar alignment information. The collimated light source further comprises a gas laser.

A more complete understanding of the dual beam laser device for linear and planar alignment will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF THE PREFERRED EMBODIMENT

The present invention satisfies the critical need for a laser alignment apparatus capable of providing a highly stable and accurate beam suitable for critical linear and planar alignment applications. The laser alignment apparatus provides a level of accuracy heretofore achievable only with gas lasers, while maintaining the economical attributes of commercial laser diodes. In the detailed description that follows, like reference numerals are used to describe like elements illustrated in one or more of the figures.

Figure 1:
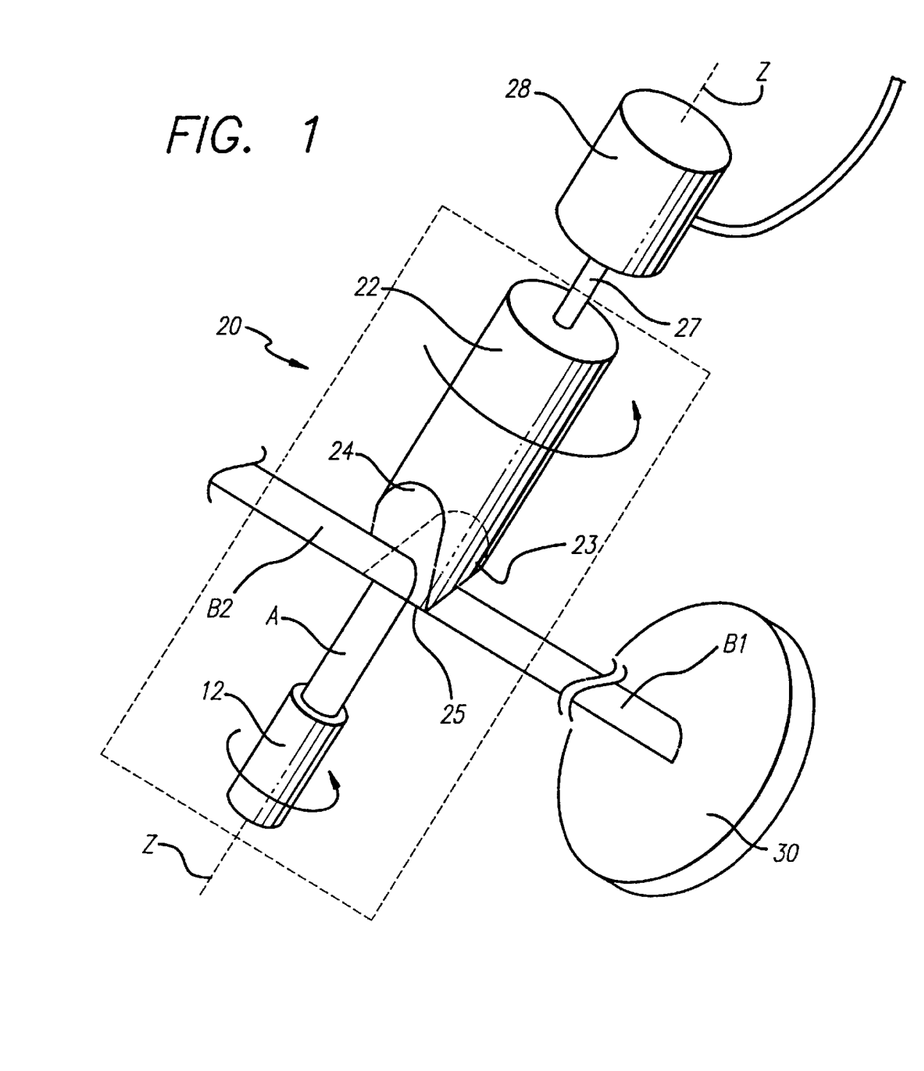
FIG. 1 is a perspective view of a first embodiment of the laser alignment apparatus of the present invention.

Referring first to FIG. 1, a first embodiment of a planar laser alignment apparatus is illustrated. The laser alignment apparatus comprises a collimated light source 12 and a rotating wedge 22. The laser device 12 may be a conventional semiconductor device, such as a laser diode, which provides a laser beam A. The wedge 22 has a central axis Z aligned approximately coincident with the laser device 12. Since the laser beam A provided by the laser device 12 is inherently unstable, it should be apparent that the central axis Z does not precisely coincide with the laser beam. The wedge 22 has first and second reflective surfaces 23, 24 disposed at an end thereof that intersect at a 90° angle to form an edge 25. Each of the first and second reflective surfaces 23, 24 are respectively disposed at a 45° angle with respect to the central axis Z of the wedge 22 and laser device 12.

A motor 28 is coupled to the wedge 22 by a shaft 27 which enables the wedge to rotate about the central axis Z. The wedge 22 may be comprised of a thermally stable material, such as glass or quartz, and may be provided with a reflective coating on the surfaces 23, 24. As known in the art, the laser source 12 and wedge 22 may be further disposed within a housing 20 that provides a mechanical structure to control and permit adjustment to the relative alignment of the operative elements. The laser source 12 is coupled mechanically to the wedge 22 via the housing 20 so that the laser device and wedge rotate in unison. The laser source 12 emits a beam A directed along the central axis to the intersection 25 of surfaces 23, 24 of the wedge 22. Upon uniformly striking the surfaces 23, 24, the beam A divides into respective beam components B1, B2. Rotation of the wedge 22 causes the beam components B1, B2 to sweep respective planar regions useful for planar alignment. The housing 20 may further include windows or other openings that permit the beam components B1, B2 to project therethrough.

A beam target 30 is disposed remotely from the wedge 22 and is oriented so that the beam components B1, B2 will impinge thereon in an alternating manner as the wedge 22 rotates. The target 30 provides a centroid measurement of the beam components B1, B2, and can be provided by conventional one or two-axis lateral-effect photodiodes formed from a semiconductor material. The photodiodes produce electrical current based upon the energy centroid of the respective laser beam components. The photodiodes produce an output that corresponds to a weighted sum of the combined light energy of the beam components B1, B2 to define a single center point of the combined light energy. Alternatively, the target 30 could be provided by a charge coupled device (CCD) type device which could be configured to provide similar energy centroid data. In either embodiment, the centroid measurement is read out using conventional electronic systems. A rotational rate would be selected for the motor 28 that is high enough to permit the beam components B1, B2 to appear as a uniform planar surface, while low enough to not overly complicate the beam target 30 electronics.

Figure 2:
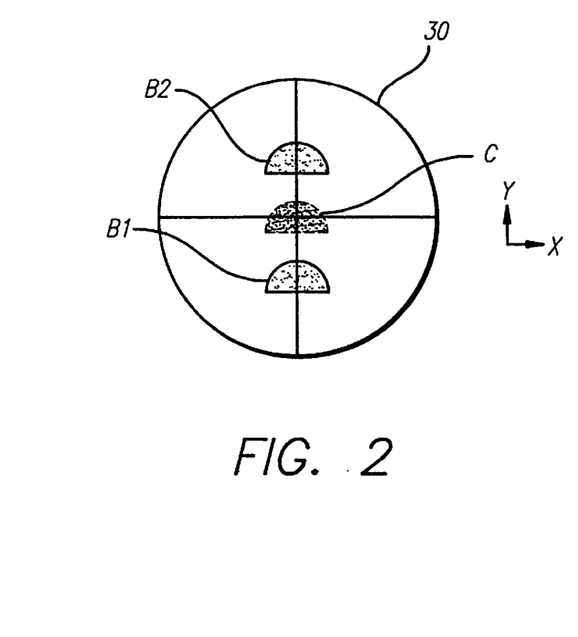
FIG. 2 is a front view of a centroid measurement device of the first embodiment having a first and second beam component impinging thereon.

As illustrated in FIG. 2, the beam target 30 has spots projected thereon that correspond to the beam components B1, B2. It should be apparent that the beam components B1, B2 do not simultaneously impinge upon the target 30, but the beam components can be made to appear to impinge simultaneously by defining the image persistence of the target to be greater than the rotational rate. Ideally, the spots formed by the beam components B1, B2 would overlap each other precisely if the source beam A were thermally stable. In practice, however, the instability of the source beam A causes the spots formed by the beam components B1, B2 to diverge in a symmetrical manner along the Y-axis dimension on the target 30. As a result, the impinging beam components appear on the target 30 as separate spots disposed above and below the X-axis, respectively, with the distance between the spots varying with the thermal instability of the laser 12. The centroid measurement of the beam components B1, B2 is illustrated in phantom at spot C, which remains constant and represents a thermally stable reference point for the planar alignment apparatus.

Figures 3, 4:
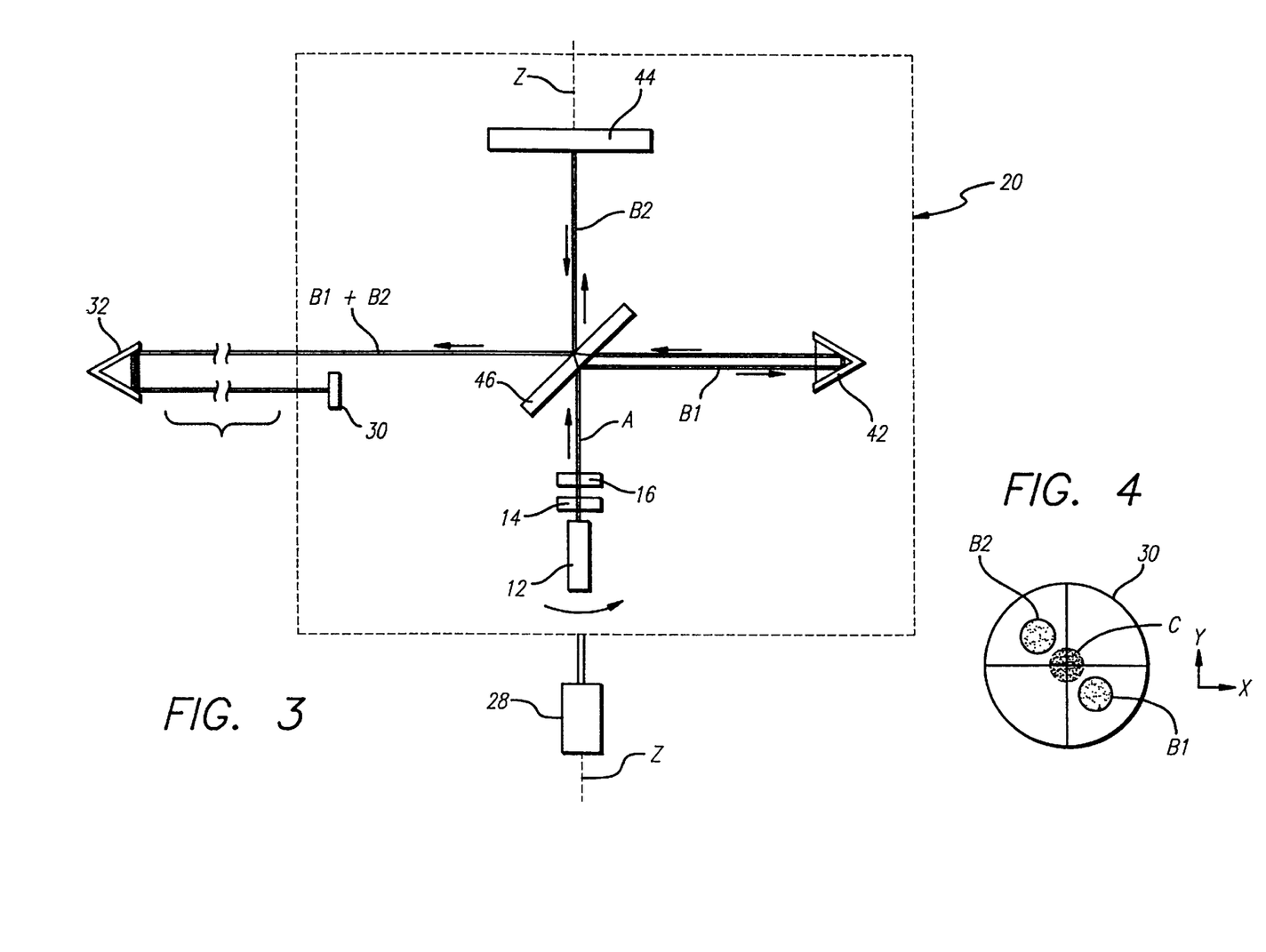
FIG. 3 is a block diagram of a second embodiment of the laser alignment apparatus useful for planar or linear alignment.
FIG. 4 is a front view of a centroid measurement device of the second embodiment having a first and second beam component impinging theron.

FIGS. 3 and 4 illustrate a second embodiment of a laser alignment apparatus configured to provide either linear or planar alignment. The laser alignment apparatus may be included within a single housing illustrated in phantom at 20. As in the first embodiment, the laser alignment apparatus comprises a collimated light source 12 provided by a semiconductor device, such as a laser diode. The light source 12 provides a laser beam A that travels in a direction approximately along a central axis Z. As noted above, the inherent instability of the laser beam A results in the beam not precisely coinciding with the central axis Z.

The laser beam A passes first through a polarizing device 14 to enhance the polarization of the laser beam A, and then through a retardation plate 16. The retardation plate 16 isolates the light source 12, and may comprise a quarter-wavelength (λ/4) optical plate. Alternatively, the retardation plate 16 may be used to match the power of the two beam components (described below), and for that purpose may comprise a half-wavelength (λ/2) optical plate. Further, the polarizing device 14 and/or retardation plate 16 may also include anti-reflective coatings that prevent stray reflections of the laser beam A back toward the laser beam source 12. Such reflections could cause undesirable oscillation of the laser beam source 12 that would result in temporal instability of the laser beam A. In this regard, the polarizing device 14 and retardation plate 16 act as an optical isolator or diode to protect the laser beam source 12.

The laser beam A is divided into two beam components B1, B2 by a beamsplitter 46, a retroreflector 42 and a reference mirror 44. The beamsplitter 46 may comprise a glass plate having a coating on a lower surface thereof that causes a portion of the laser beam A to reflect therefrom to provide the beam component B1. The beamsplitter 46 is disposed at a 45° angle with respect to the central axis Z to produce an approximately 50% reflection of the beam component B1 in a direction normal to the central axis. In the preferred embodiment, the beamsplitter 46 is formed from optical quality glass having a high degree of smoothness. Alternatively, a pellicle-type beamsplitter comprising a thin mylar sheet may be advantageously utilized. The beam component B1 reflects collinearly off of the retroreflector 42, returning the beam component B1 back to the beamsplitter 46. The reflected beam component B1 then passes partially through the beamsplitter 46 in a direction normal to the central axis Z.

The portion of the laser beam A that has not reflected off of the beamsplitter 46 passes through the beamsplitter as beam component B2. The beam component B2 follows a path along the central axis Y and reflects off of the surface of the reference mirror 44. The reflected beam component B2 then returns to the beamsplitter 46, and reflects off the beamsplitter in a partially overlapping manner with the beam component B1. The overlapping beam components B1, B2 (illustrated in FIG. 3 as beams B1+B2) provide a reference beam for the linear alignment apparatus. The beamsplitter 46 may additionally be provided with an anti-reflective coating on an upper surface thereof to improve beam transmittance therethrough and mitigate any internal reflections. Accordingly, the lower surface of the beamsplitter 46 is operative to provide the above described reflections of the beam components B1, B2.

A retroreflector 32 disposed remotely from the laser alignment apparatus receives the overlapping beam components B1, B2, and reflects them collinearly back toward the laser alignment apparatus. As in the first embodiment, a beam target 30 is oriented so that the collinearly reflected beam components impinge thereon. As illustrated in FIG. 3, the beam target 30 may be collocated with the laser alignment apparatus housing 20. Alternatively, the beam target 30 may be disposed remotely from the laser alignment apparatus housing 20 and instead may be oriented to receive the overlapping beam components B1, B2 directly from the laser alignment apparatus without a retroreflector 32, or may be disposed with the retroreflector as part of a remote sensing unit. Moreover, a plurality of beam targets 30 may be disposed at different locations in order to measure relative alignment therebetween.

The beam target 30 has spots projected thereon that correspond to the beam components B1, B2. In the absence of instability of the source laser beam A, the beam components B1, B2 would overlap precisely. As can be seen in FIG. 4, however, the instability of the source beam A causes the beam components B1, B2 to diverge symmetrically in both the X and Y-axis dimensions. As a result, the impinging beam components appear on the target 30 as separate spots disposed uniformly like mirror-images about the origin of the X and Y-axes, with the distance between the spots and their relative orientation varying with the angular instability of the laser device 12. The centroid measurement of the beam components B1, B2 illustrated in phantom at spot C remains constant and represents a thermally stable reference point for the linear alignment apparatus.

In order to provide a planar alignment system, the alignment apparatus further comprises a motor 28. The housing 20 containing the laser beam source 12, polarization device 14, beamsplitter 46, retroreflector 42, reference mirror 44 and target 30 may be rotatable while maintaining these elements in a proper relative orientation. The motor 28 is coupled to the housing 20 in a manner that enables the housing to rotate about the central axis Z. Rotation of the housing 20 causes the overlapping beam components B1, B2 to sweep respective planar regions, similar to the first embodiment described above. The beam target 30 will continue to collect centroid information in the same manner described above to provide planar alignment information. Accordingly, it should be apparent that the same alignment apparatus can be used to provide either linear or planar alignment information.

Figures 5, 6A, 6B:
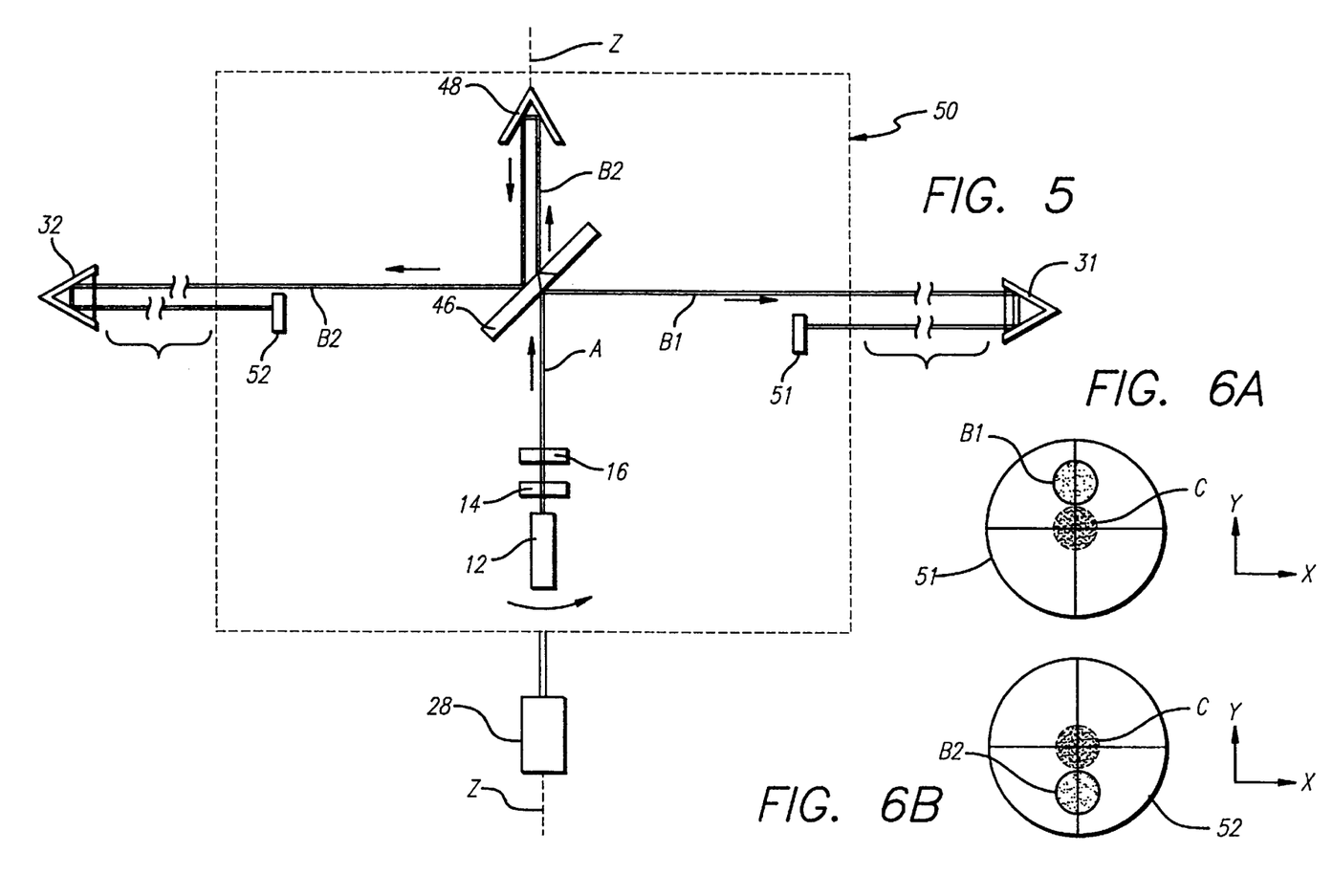
FIG. 5 is a block diagram of a third embodiment of the laser alignment apparatus useful for planar alignment.
FIGS. 6a and 6b are front views of centroid measurement devices of the third embodiment having a first and second beam component impinging thereon, respectively.

In FIGS. 5, 6a and 6b, a third embodiment of a laser alignment apparatus configured to provide planar alignment is illustrated. The laser alignment apparatus is contained within a housing illustrated in phantom at 50. As in the previous two embodiments, the laser alignment apparatus includes a collimated light source 12 provided by a semiconductor device, such as a laser diode. The light source 12 provides a moderately polarized laser beam A that travels in a direction along a central axis Z, which is ideally coincident with the laser beam A. The laser beam A passes through a polarization device 14 and a retardation plate 16 in order to improve the polarization of the laser beam A, preclude stray reflection, and/or match beam component power, as described above.

The beamsplitter 46 of FIG. 5 operates in a similar manner to that of FIG. 3 by dividing the laser beam A into two beam components B1, B2. As in FIG. 3, the beamsplitter 46 has a coating on a lower surface thereof that causes a portion of the laser beam A to reflect therefrom to provide the beam component B1. The beamsplitter 46 is disposed at a 45° angle with respect to the central axis Z to produce a reflection of the beam component B1 in a direction normal to the central axis Z. Unlike the second embodiment of FIG. 3, however, the beam component B1 is transmitted outwardly from the laser alignment apparatus to provide a first planar reference beam.

Instead of the reference mirror 44, a retroreflector 48 receives the beam component B2 as it follows a path along the central axis Z. The retroreflector 48 reflects the beam component B2 collinearly back to the beamsplitter 46. The reflected beam component B2 then reflects off the beamsplitter 46 in a direction normal to the central axis Z and directly opposite from the direction of the beam component B1. The beam component B2 is then transmitted outwardly from the laser alignment apparatus to provide a second planar reference beam. The alignment apparatus further comprises a motor 28 coupled to the housing 50 in a manner that enables the housing to rotate about the central axis Z. Rotation of the housing 50 causes the beam components B1, B2 to sweep respective planar regions, similar to the first embodiment described above.

A retroreflector 31 disposed remotely from the laser alignment apparatus receives the beam component B1 and reflects it collinearly back towards the laser alignment apparatus. Similarly, a retroreflector 32 disposed remotely from the laser alignment apparatus receives the beam component B2, and reflects it collinearly back towards the laser alignment apparatus. A pair of beam targets 51, 52 are oriented so that the respective reflected beam components B1, B2 impinge thereon. As in the previous embodiment, the beam targets 51, 52 may be co-located with the laser alignment apparatus housing 50. Alternatively, the beam targets 51, 52 may be disposed remotely from the laser alignment apparatus housing 50 and instead may be oriented to receive the respective beam components B1, B2 directly from the laser alignment apparatus without the respective retroreflectors 31, 32, or may be disposed with the retroreflectors 31, 32 as part of respective remote sensing units.

The beam targets 51, 52 have spots projected thereon that correspond to the beam components B1, B2. As shown in FIGS. 6a and 6b, the impinging beam components B1, B2 appear on the targets 51, 52 as spots disposed symmetrically above and below the X-axis. The targets 51, 52 operate together as a single target to provide a centroid measurement of the beam components B1, B2 illustrated in phantom at spot C in each target. The phantom image at spot C remains constant and represents a thermally stable planar reference point for the alignment apparatus.

It should be apparent to those skilled in the art that a single laser alignment apparatus could be constructed to operate in accordance with both the second and third embodiments described above. The retroreflector 42 of FIG. 3 could be disposed within the housing 20 in a manner that permits it to be manipulated into a position in front of the reference mirror 44. This way, the retroreflector 42 would then be in the position of the retroreflector 48 of FIG. 5. The beam component B1 would then project outwardly in a direction opposite from the beam component B2 as in the embodiment of FIG. 5, rather than partially overlapping the beam component B2 as in the embodiment of FIG. 3. Such a construction would yield substantial additional utility and flexibility to a single laser alignment apparatus.

Figures 7, 10:
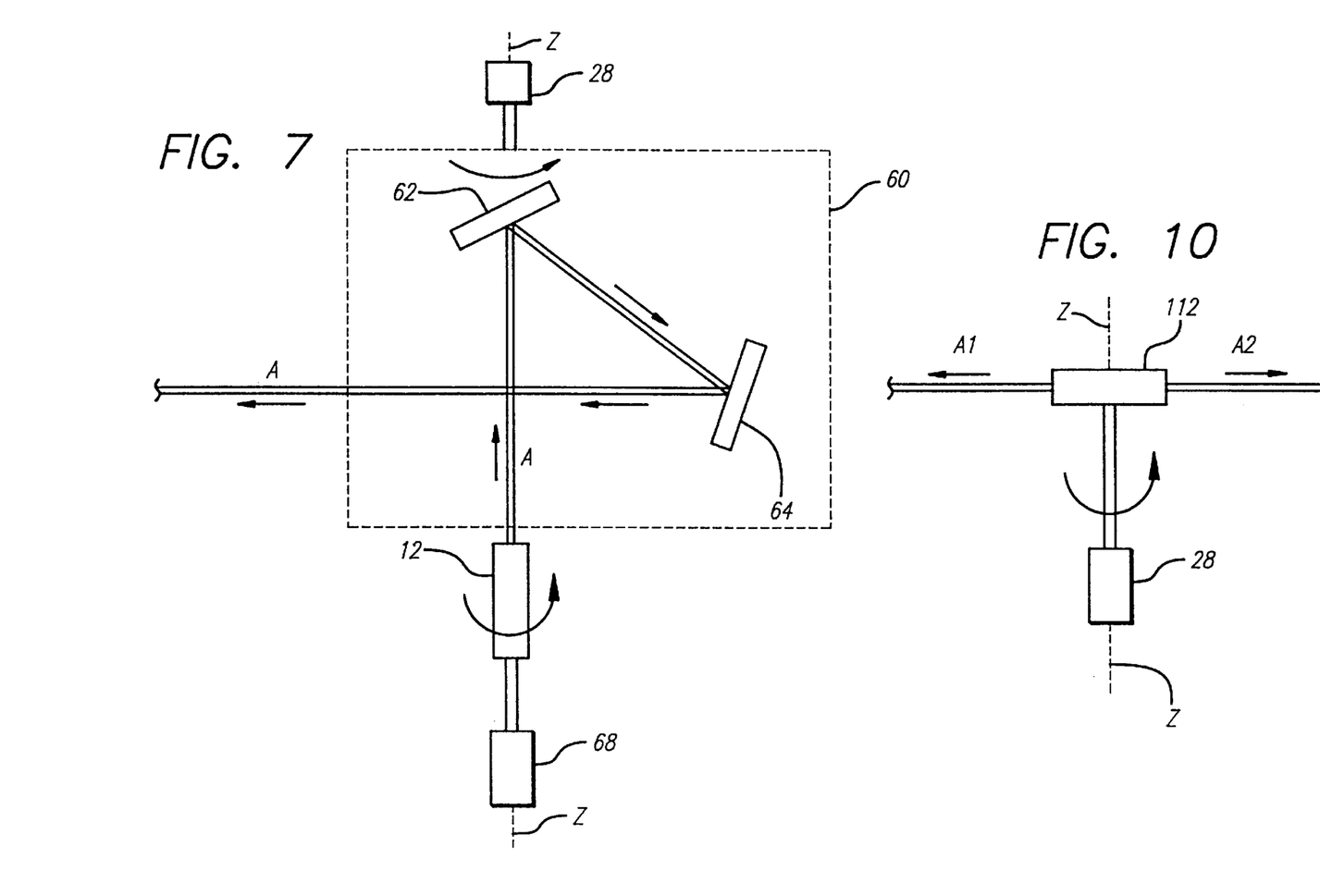
FIG. 7 is a block diagram of a fourth embodiment of the laser alignment apparatus.
FIG. 10 is a block diagram of a seventh embodiment of the laser alignment apparatus.

FIG. 7 illustrates a fourth embodiment of a laser alignment apparatus configured to provide planar alignment. As in the previous embodiments, the laser alignment apparatus includes a collimated light source 12 provided by a semiconductor device, such as a laser diode. The light source 12 provides a laser beam A that travels roughly in a direction along a central axis Z. As in the previous embodiments, a polarizer may be utilized to improve the polarization of the laser beam A.

The laser beam A reflects successively off of a pair of reflective surfaces 62, 64 to redirect the laser beam A in a direction normal to the central axis Z. The reflective surfaces 62, 64 may comprise separate optical elements, or alternatively, may comprise separate surfaces of a single optical element, such as a pentaprism or penta-mirror. The reflective surfaces 62, 64 are further disposed within a single housing 60. The housing 60 is rotatable independently of the light source 12 about the central axis Z. A motor 68 coupled to the housing 60 rotates the housing about the central axis Z, causing the laser beam A to sweep a planar region. At the same time, the light source 12 is also coupled to a motor 28 that causes the laser beam A to rotate about the axis. The motors 28, 68 may be controlled separately so that they rotate at distinct rotational rates, as will be described below.

As in the previous embodiments, a beam target (not shown in FIG. 7) is oriented so that the laser beam A will impinge thereon. The beam target may be co-located with the laser alignment apparatus housing 60, or alternatively, the beam target may be disposed remotely from the laser alignment apparatus housing. The beam target may also be oriented to receive the beam A from the laser alignment apparatus with or without a retroreflector as part of a remote sensing unit.

In this embodiment, the single laser beam A is utilized to provide the planar alignment information, rather than the pair of beam components in the previous embodiments. By rotating the housing 60 at a different rate than the laser beam source 12, thermal fluctuations in the laser beam A will appear as shifts in position of the laser spot impinging on the beam target. As described previously, the beam target will average the laser spot positions from successive passes of the laser beam A, i.e., detect a centroid position from the successive laser spots. The rotational rate of the housing 60 may be selected to be half the rotational rate of the laser beam source 12, or alternatively, a harmonic relationship between the rotational rates may be advantageously utilized.

Figure 8:
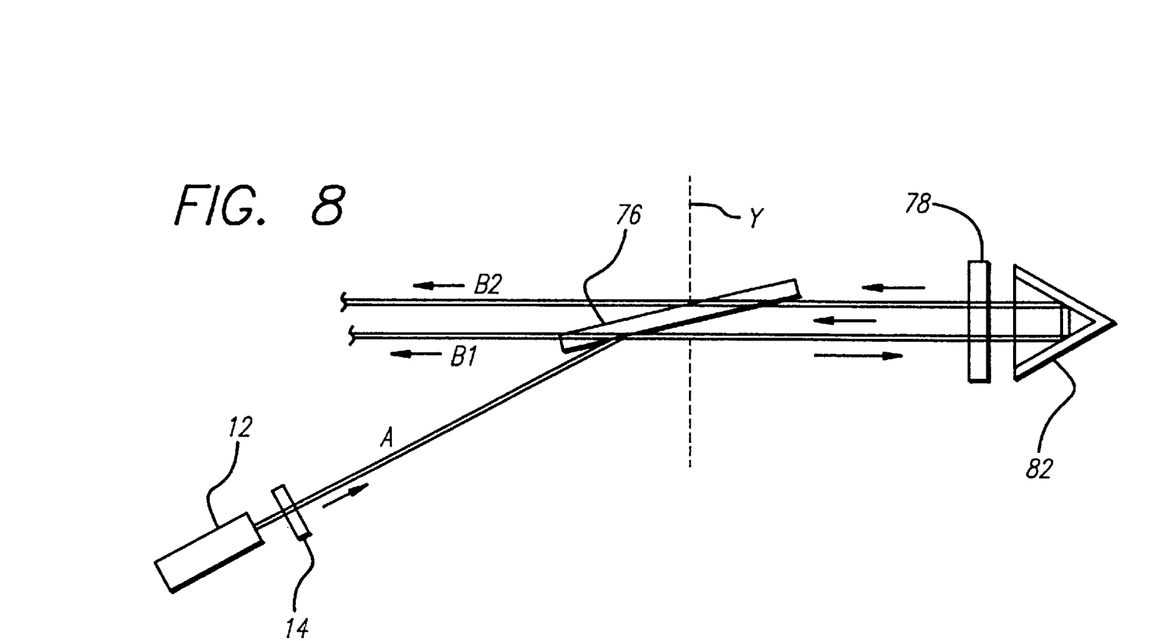
FIG. 8 is a block diagram of a fifth embodiment of the laser alignment apparatus.

In FIG. 8, a fifth embodiment of a laser alignment apparatus is illustrated which is configured to provide linear or planar alignment. As in the previous embodiments, the laser alignment apparatus includes a collimated light source 12 provided by a semiconductor device, such as a laser diode. The light source 12 provides a laser beam A, and a polarizer 14 may be utilized to polarize the laser beam A. Unlike the previous embodiments, however, the direction of the laser beam A upon emission from the light source 12 is not normal to its ultimate direction.

Instead, the laser beam A is directed to a polarization beamsplitter comprising a glass plate 76, a second polarizing device 78 and a retroreflector 82. The glass plate 76 has a surface coating that reflects a portion of the laser beam A having a particular polarization. The angle in which the glass plate 76 is disposed with respect to the laser beam source 12 is known as the Brewster angle, and is dependent upon the surface coating applied to the glass plate. Preferably, the glass plate 76 is formed from optical quality glass having a high degree of smoothness and is disposed at a roughly 57° angle with respect to the central axis of the light source 12. The second polarizing device 78 may be a conventional polarization beamsplitter.

The reflected portion of the laser beam A impinges perpendicularly onto the surface of the second polarizing device 78. A first beam component B1 reflects directly off of the second polarizing device 78, and a second beam component B2 passes through the second polarizing device. A retardation plate may additionally be utilized to isolate the light source 12 or to match the power of the beam components, as described above. The retroreflector 82 reflects the second beam component B2 back collinearly toward the glass plate 76. Thereafter, both the first beam component B1 and the second beam component B2 pass through the glass plate 76 in a collinear manner to provide a linear alignment reference beam. As in the previous embodiments, a beam target may be utilized to determine a centroid of the two beam components B1, B2 in order to provide a thermally stable reference point. Also, the entire apparatus may be rotated to provide a planar reference beam, as substantially described above.

Figure 9:
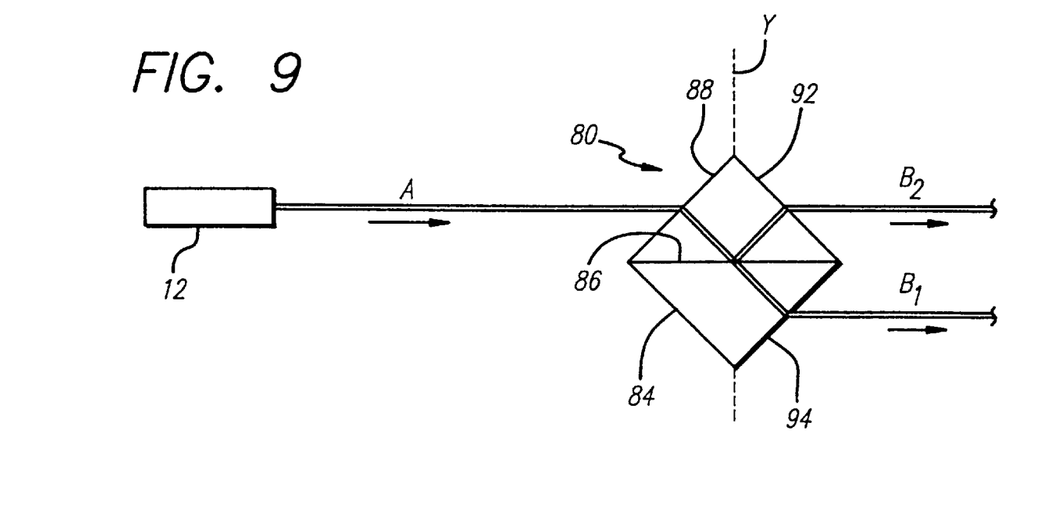
FIG. 9 is a block diagram of a sixth embodiment of the laser alignment apparatus.

In FIG. 9, a sixth embodiment of a laser alignment apparatus is illustrated which is configured to provide linear or planar alignment. As in the previous embodiments, the laser alignment apparatus includes a collimated light source 12 provided by a semiconductor device, such as a laser diode. As in the previous embodiment, the direction of the laser beam A upon emission from the light source 12 is not normal to its ultimate direction.

The laser beam A is directed onto a beamsplitter cube 80, which divides the beam into a first beam component B1 and a second beam component B2. As known in the art, the beamsplitter cube 80 has four exposed outer surfaces 84, 88, 92, and 94. A partially reflective boundary 86 is defined through the center of the cube 80 that effective joins the intersection of surfaces 84, 88 with the intersection of surfaces 92, 94. As illustrated in FIG. 9, the laser beam A impinges onto the surface 88, and is refracted inward toward the boundary 86. The refracted laser beam A is divided at the boundary 86 into the first beam component B1 that passes through the boundary and the second beam component B2 that reflects off of the boundary. The first beam component B1 emerges from the cube 80 at surface 94, and the second beam component B2 emerges from the cube 80 at surface 92.

The two beam components B1, B2 are then projected outwardly in a collinear manner to provide a linear alignment reference beam. As in the previous embodiments, a beam target may be utilized to determine a centroid of the two beam components B1, B2 in order to provide a thermally stable axial reference point. Also, the entire apparatus may be rotated to provide a planar reference beam, as substantially described above.

In FIG. 10, a seventh embodiment of a laser alignment apparatus is illustrated which is configured to provide planar alignment. Unlike the previous embodiments, the laser alignment apparatus includes a collimated light source 112 provided by a gas laser device containing a suitable active gaseous element, such as helium-neon gas. The light source 112 comprises a tubular shaped element that is capable of emitting laser beams A1, A2 from opposite ends, respectively. The laser beams A1, A2 are directed along a common axis of the light source 112 in opposing directions.

A motor 28 is coupled to the light source 112 in a manner perpendicular to a central axis Z of the light source. Rotation of the laser beam source 112 by the motor 28 causes the beams A1, A2 to sweep respective planar regions. As in the previous embodiments, a beam target may be utilized to determine a centroid of the two beams A1, A2 in order to provide a planar reference point. It should be apparent that the laser beams A1, A2 have much greater thermal stability than the laser diodes described in the preceding embodiments of the invention; nevertheless, the centroid measurement would permit even greater planar alignment accuracy than that achievable with either laser diodes or conventional gas laser alignment systems.

Having thus described a preferred embodiment of dual beam laser device for linear and planar alignment, it should be apparent to those skilled in the art that certain advantages of the within system have been achieved. It should also be appreciated that various modifications, adaptations, and alternative embodiments thereof may be made within the scope and spirit of the present invention. For example, holographic and/or detractive optic elements may be utilized to split a source laser beam into beam components, rather than the more conventional optical components described above. Further, beam components may be caused to sweep planar regions through an oscillatory movement in which the optical systems are rotated through less than a full 360° of motion, then returned in an opposite direction through an equivalent range of motion, as opposed to a continuous rotation in a single direction. The invention is defined by the following claims.

What is claimed is:

1. An apparatus for providing a reference beam for use in an alignment system, comprising:
    a collimated light source providing a light beam;
    a wedge having first and second faces that respectively reflect first and second beam components of said light beam in substantially opposite directions;
    a photodetector oriented to permit said first and second beam components to impinge thereon and provide a common centroid measurement of said first and second beam components that is independent of drift of said light beam; and
    a motor coupled to said wedge for rotating said wedge and thereby cause said first and second beam components to sweep respective planar regions;
    whereby said common centroid provides an inherent correction for any fluctuation of said light beam and thereby provides a planar alignment.

2. The apparatus of claim 1, wherein said collimated light source further comprises a semiconductor laser device.

3. The apparatus of claim 1, wherein said first and second faces of said wedge intersect orthogonally to form an edge.

4. The apparatus of claim 1, wherein said wedge is comprised of a thermally stable material.

5. An apparatus for providing a reference beam for use in an alignment system, comprising:
    a collimated light source providing a light beam;
    means for dividing said light beam into first and second beam components, wherein said dividing means further comprises:
        a housing;
        a beamsplitter disposed within said housing at a predetermined angle, said beamsplitter having a reflective coating that reflects said first beam component therefrom, said second beam component being transmitted through said beamsplitter;
    means for sweeping said first and second beam components through respective planar regions; and
    means for detecting a common centroid of said first and second beam components, wherein said common centroid is independent of drift of said light beam and such independency provides an inherent correction for any fluctuation of said light beam;
    whereby said common centroid provides linear alignment when said beam components are projected in a collinear and/or overlapping manner, and provides planar alignment when said beam components are swept through said respective planar regions.

6. The apparatus of claim 5, wherein said dividing means further comprises:
    a retroreflector disposed within said housing and collinearly reflecting said transmitted second beam component back to said beamsplitter, said second beam component being thereby reflected therefrom in a direction opposite from said direction of said first beam component.

7. The apparatus of claim 5, wherein said beamsplitter further comprises an optical glass plate.

8. The apparatus of claim 5, wherein said detecting means further comprises:
    a retroreflector disposed remotely from said dividing means and collinearly reflecting said first and second beam components; and
    a photodetector oriented to permit said reflected first and second beam components to impinge thereon and provide said common centroid measurement therefrom.

9. The apparatus of claim 5, wherein said light beam further comprises a laser beam.

10. The apparatus of claim 5, further comprising means for optically isolating said light source from said dividing means.

11. An apparatus for providing a reference beam for use in an alignment system, comprising:
    a collimated light source providing a light beam;
    a housing;
    a beamsplitter disposed within said housing at a predetermined angle, said beamsplitter having a reflective coating that reflects said first beam component therefrom, said second beam component being transmitted through said beamsplitter; and
    a photodetector oriented to permit said reflected first and second beam components to impinge thereon and provide a common centroid measurement therefrom, said common centroid being independent of drift of said light beam and such independency providing an inherent correction for any fluctuation of said light beam;

whereby said common centroid provides linear alignment when said beam components are projected in a collinear and/or overlapping manner, and provides planar alignment when said beam components are swept through respective planar regions.

12. The apparatus of claim 11, wherein said beamsplitter further comprises an optical glass plate.

13. The apparatus of claim 11, wherein said light beam further comprises a laser beam.

14. The apparatus of claim 11, further comprising a polarizing device and a retardation plate for optically isolating said light source from said beamsplitter.

15. An apparatus for providing a reference beam for use in an alignment system, comprising:

a collimated light source providing a light beam;

means for dividing said light beam into first and second beam components, said dividing means comprising:

first optical means disposed at a predetermined angle with respect to said light beam for reflecting said first beam component therefrom and for transmitting said second beam component therethrough;

second optical means for collinearly reflecting said reflected first beam component back to said first optical means, said first beam component being thereby transmitted through said first optical means; and third optical means for coaxially reflecting said second beam component back to said first optical means, said reflected second beam component being thereby reflected off of said first optical means in an overlapping manner with said first beam component; and means for detecting a common centroid of said first and second beam components, said common centroid being independent of drift of said light beam and such independency providing an inherent correction for any fluctuation of said light beam;

whereby said common centroid provides linear alignment when said beam components are projected in a collinear and/or overlapping manner, and provides planar alignment when said beam components are swept through a planar region.

16. The apparatus of claim 15, wherein said first optical means further comprises a beamsplitter having a reflective coating on at least one surface thereof.

17. The apparatus of claim 15, wherein said second optical means further comprises a retroreflector.

18. The apparatus of claim 15, wherein said third optical means further comprises a reference mirror.

19. The apparatus of claim 15, wherein said detecting means further comprises a photodetector oriented to permit said first and second beam components to impinge thereon and provide said common centroid measurement therefrom.

20. The apparatus of claim 19, wherein said detecting means further comprises a retroreflector disposed remotely from said dividing means and collinearly reflecting said first and second beam components onto said photodetector.

21. The apparatus of claim 15, wherein said collimated light source further comprises a laser diode.

22. An apparatus for providing a reference beam for use in an alignment system, comprising:

a collimated light source providing a light beam;

a beamsplitter dividing said light beam into first and second beam components, said beamsplitter being disposed at a predetermined angle with respect to said light beam for reflecting said first beam component therefrom and for transmitting said second beam component therethrough, a retroreflector collinearly reflecting said reflected first beam component back to said beamsplitter, said first beam component being thereby transmitted through said beamsplitter, a reference mirror coaxially reflecting said second beam component back to said beamsplitter, said reflected second beam component being thereby reflected off of said beamsplitter in an overlapping manner with said first beam component; and a photodetector oriented to permit said first and second beam components to impinge thereon and provide a common centroid measurement therefrom, said common centroid being independent of drift of said light beam and such independency providing an inherent correction for any fluctuation of said light beam;

whereby said common centroid provides linear alignment when said beam components are projected in a collinear and/or overlapping manner, and provides planar alignment when said beam components are swept through a planar region.

23. The apparatus of claim 22, wherein said beamsplitter has a reflective coating on at least one surface thereof.

24. The apparatus of claim 22, further comprising a second retroreflector disposed remotely from said beamsplitter, said retroreflector and said reference mirror and collinearly reflecting said first and second beam components onto said photodetector.

25. The apparatus of claim 22, wherein said collimated light source further comprises a laser diode.

26. An apparatus for providing a reference beam for use in an alignment system, comprising:

a collimated light source providing a light beam;

means for dividing said light beam into collinear first and second beam components, said dividing means comprising:

first optical means disposed at a predetermined angle for reflecting said light beam therefrom;

second optical means for reflecting said first beam component therefrom back to said first optical means, said first beam component being thereby transmitted through said first optical means, said second optical means further transmitting said second beam component therethrough; and third optical means for coaxially reflecting said second beam component back to said first optical means, said reflected second beam component being thereby transmitted through said first optical means in a collinear manner with said first beam component; and means for detecting a common centroid of said first and second beam components, said common centroid being independent of drift of said light beam and such independency providing an inherent correction for any fluctuation of said light beam;

whereby said common centroid provides linear alignment when said beam components are projected in a collinear manner, and provides planar alignment when said beam components are swept through a planar region.

27. The apparatus of claim 26, wherein said first optical means further comprises a beamsplitter having a reflective coating on at least one surface thereof.

28. The apparatus of claim 26, wherein said second optical means further comprises a polarization beamsplitter.

29. The apparatus of claim 26, wherein said third optical means further comprises a retroreflector.

30. The apparatus of claim 26, wherein said collimated light source further comprises a laser diode.

31. An apparatus for providing a reference beam for use in an alignment system, comprising:

a collimated light source providing a light beam;

a beamsplitter dividing said light beam into collinear first and second beam components, said beamsplitter being disposed at a predetermined angle for reflecting said light beam therefrom, a polarizer reflecting said first beam component therefrom back to said beamsplitter, said first beam component being thereby transmitted through said beamsplitter, said polarizer further transmitting said second beam component therethrough, a retroreflector coaxially reflecting said second beam component back to said beamsplitter, said reflected second beam component being thereby transmitted through said beamsplitter in a collinear manner with said first beam component; and a photodetector detecting a common centroid of said first and second beam components, said common centroid being independent of drift of said light beam and such independency providing an inherent correction for any fluctuation of said light beam;

whereby said common centroid provides linear alignment when said beam components are projected in a collinear manner, and provides planar alignment when said beam components are swept through a planar region.

32. The apparatus of claim 31, wherein said beamsplitter has a reflective coating on at least one surface thereof.

33. The apparatus of claim 31, wherein said collimated light source further comprises a laser diode.

34. An apparatus for providing a reference beam for use in an alignment system, comprising:

a collimated light source providing a light beam;

means for dividing said light beam into collinear first and second beam components, said dividing means comprising a plurality of external surfaces and an internal partially reflective boundary, said light beam impinging upon said dividing means at an oblique angle at a first external surface thereof and internally deflecting said light beam therein, a first beam component being reflected from said partially reflective boundary and passing outwardly of said dividing means through a second external surface of said dividing means in a reference direction, a second beam component being thereby transmitted through said partially reflective boundary and passing outwardly of said dividing means through a third external surface of said dividing means in said reference direction; and means for detecting a common centroid of said first and second beam components, said common centroid being independent of drift of said light beam and such independency providing an inherent correction for any fluctuation of said light beam;

whereby said common centroid provides linear alignment when said beam components are projected outwardly in a collinear manner, and provides planar alignment when said beam components are swept through a planar region.

35. The apparatus of claim 34, wherein said dividing means further comprises an optical glass cube.

36. The apparatus of claim 34, wherein said collimated light source further comprises a laser diode.

* * * * *